(12) United States Patent
Pearce et al.

(10) Patent No.: US 12,206,334 B2
(45) Date of Patent: Jan. 21, 2025

(54) NETWORKED AUTOMATION SYSTEM FOR START-UP OF A SWITCH MODE POWER SUPPLY

(71) Applicant: KOLLMORGEN CORPORATION, Radford, VA (US)

(72) Inventors: Robert Pearce, Bristol (GB); George Borkey Yundt, Andover, MA (US)

(73) Assignee: KOLLMORGEN CORPORATION, Radford, VA (US)

( * ) Notice: Subject to any disclaimer, the term of this patent is extended or adjusted under 35 U.S.C. 154(b) by 155 days.

(21) Appl. No.: 18/081,305

(22) Filed: Dec. 14, 2022

(65) Prior Publication Data

US 2023/0198412 A1 Jun. 22, 2023

Related U.S. Application Data

(60) Provisional application No. 63/290,226, filed on Dec. 16, 2021.

(51) Int. Cl.
| | | |
|---|---|---|
| G06F 15/16 | (2006.01) | |
| H02M 1/32 | (2007.01) | |
| H02M 3/335 | (2006.01) | |
| H02P 29/02 | (2016.01) | |

(52) U.S. Cl.
CPC ............ *H02M 3/335* (2013.01); *H02M 1/32* (2013.01); *H02P 29/02* (2013.01)

(58) Field of Classification Search
CPC ........ H02M 3/335; H02M 1/32; H02M 1/007; H02M 1/36; H02M 3/33523; H02M 3/33569; H02M 1/0006; H02P 29/02; H02J 1/06

See application file for complete search history.

(56) References Cited

U.S. PATENT DOCUMENTS

| | | | | |
|---|---|---|---|---|
| 8,566,415 | B2 * | 10/2013 | Pearce | H04L 12/40182 |
| | | | | 370/278 |
| 2010/0006378 | A1 | 1/2010 | Blasko | |
| 2013/0049668 | A1 | 2/2013 | Yundt et al. | |
| 2013/0054724 | A1 * | 2/2013 | Yundt | H04L 12/40182 |
| | | | | 709/208 |
| 2014/0084875 | A1 * | 3/2014 | Bender | H02P 5/46 |
| | | | | 320/166 |
| 2019/0131879 | A1 * | 5/2019 | Oshima | G01R 19/16547 |

OTHER PUBLICATIONS

"Depletion-Mode power MOSFETs and Applications", Abdus Satter, IXYS Corporation, 2008, 10 pages.
Unitrode Application No. U-100A, "UC3842/3/4/5 Provides Low-Cost Current-Mode Control", 1999, 15 pages.
International Search Report and Written Opinion in International Application No. PCT/US2022/052874, dated Apr. 25, 2023, 9 pages.

* cited by examiner

*Primary Examiner* — Muhammad S Islam
(74) *Attorney, Agent, or Firm* — Day Pitney LLP; George Chaclas; Anthony A. Kassas

(57) ABSTRACT

Networked automation systems having electric actuation from a high voltage source. The electric actuator includes a switch mode power supply coupled to the high voltage source as a principal power source. The networked automation systems include a controller device having an output network port wired to an input network port of the motor drive. The controller device is also coupled to an auxiliary source of power. Thus, a regulation circuit of the switch mode power supply can be coupled to the auxiliary source of power, thereby providing power for the regulation circuit at start up.

15 Claims, 12 Drawing Sheets

NETWORKED AUTOMATION SYSTEM FOR START-UP OF A SWITCH MODE POWER SUPPLY

CROSS-REFERENCE TO RELATED APPLICATIONS

The present application claims priority to U.S. Provisional Patent Application No. 63/290,226 dated Dec. 16, 2021, the contents of which are incorporated by reference herein in its entirety for all purposes.

FIELD OF THE DISCLOSURE

The subject disclosure relates to switch mode power supplies, and more particularly to switch mode power supplies embodied in an electric actuator connected to a network such as, for example, an apparatus operated at high voltages that supply electronic control circuits, especially high integrity electronic control circuits. Such electronic control circuits are used in electronic controls for motor driven shafts found in automated machinery and other electrically driven equipment. Such electronic control circuits are also found more generally in automation systems in the fields of avionics, transportation, medical equipment, manufacturing, and process control.

BACKGROUND

Electric motor drives of more than 100 W rating generally derive their motive power, namely the source of power for the amplifier that controls the electric motor, from a mains electricity supply. For example, an incoming mains electricity supply may be rectified to create a high voltage DC bus of approximately 600V DC. Alternatively, a mains rectifier circuit may be located in an external rectifier module such that the electric motor drive is instead supplied with a DC bus of approximately 600 to 900V DC. The rectifier module may include a regulator for power factor correction of the input currents. The rectifier module may also boost the DC output voltage level.

In addition to a high voltage power port for motive power, it is commonplace for electric motor drives to have a second supply port, the function of which is to power internal control electronics but that does not supply the motive power. This second port, referred to herein as a control power port, is often 24V DC. The control port power sometimes additionally supplies the power used to release a motor brake or brakes, thus the current requirements from 24V may be higher than 100 W. If there are several motors in a system, the total system current requirement from 24V can easily exceed the 20 A capacity of commonly available 24V DC power supplies. Therefore, it is desirable, economical and convenient to power the drive's control electronics and motor brakes using a supply located inside the drive that uses the high voltage power port as its source. The current drawn from 600V to create 96 W of 24V control power is only 200 mA—even allowing for a conversion efficiency of 80%—and therefore imposes only a small burden on a shared DC bus.

It is advantageous for electric motor drives to be connected to the high voltage AC or DC bus using bus bars rather than wiring. This results in a tidier, more compact installation. This is especially true when a high voltage DC bus is used without a 24V DC control power port, because only three bus bars are required: namely +HV, −HV, and protective earth. The MKD Multiaxis Servo Drive System from Kollmorgen Inc. is an example of a product wherein each servo drive module is solely powered from a high voltage DC bus. Alternatively, +HV, −HV, protective earth, and a network used for control and monitoring may be advantageously combined in a single 'hybrid cable' used to power a drive. The AKD-N Decentralized Servo Drive, also from Kollmorgen Inc., is an example of a servo drive solely powered and controlled from a hybrid cable.

U.S. Patent Publication No. U.S. 20130049668A1 teaches a back-up mode on the HV DC bus where, upon removal of mains power from the rectifier module, the HV DC bus is held up by an electrically safe voltage such as 60V DC, for example to allow a limited number of brakes to be released during maintenance. In such a system, the switch mode power supply in the drive that creates the 24V control power rail and other low voltage rails used on the control circuit has a minimum start-up and operating voltage of approximately 45V in back-up mode and a maximum start-up and operating voltage of 900V when the system is fully powered.

Modern servo drives commonly incorporate functional safety circuitry that enforces restrictions on motion, for example when a light curtain is interrupted. This safety circuitry is powered by the switch mode control power supply in the drive. The safety circuitry only operates safely when its supply voltage is limited to the design value, even when there is a fault or an accumulation of faults in the switch mode power supply. U.S. Pat. No. 10,840,696 teaches techniques for limiting the output voltage of switch mode supplies by incorporating additional supervision and shut-down circuits, which are themselves safety circuits, into the primary side circuit of the switch mode power supply.

Other patents are relevant to the background of the subject technology. For example: U.S. Pat. No. 8,566,415 to Pearce and Yundt, entitled Safe Torque Off Over Network Wiring, issued on Oct. 22, 2013; and U.S. Pat. No. 10,770,929 by Yundt. The entirety of all patents noted herein is incorporated herein by reference.

SUMMARY

The safety circuits of drives incorporating functional safety must themselves be operated from a limited voltage. This operation is difficult to achieve with a wide range of supply voltage because of the difficulty of creating a start-up circuit which is voltage limiting even under fault conditions. The subject technology overcomes these and many other shortcomings of the prior art.

The subject technology is directed to an efficient apparatus for starting up switch mode power supply from wide range of DC bus voltages. In this regard, the subject technology supplies start up power to a PWM regulator circuit of a switch mode power supply of a device via network wiring. The subject technology, being voltage limiting, further enables safety circuitry to be connected to the PWM regulator circuit of a switch mode power supply and its associated reservoir capacitor.

In one aspect, the subject technology includes a networked automation system. The networked automation system includes at least one motor drive being powered from a high voltage source, the at least one motor drive comprising a switch mode power supply, the switch mode power supply being coupled to the high voltage source as its principal power source. The networked automation system includes a controller device, a network port of the controller device being wired to a network port of the at least one motor drive to form a network wiring. A regulation circuit of the switch mode power supply is coupled to an auxiliary source of power supplied from the network wiring thereby providing power for the regulation circuit to operate.

In another aspect, the at least one motor drive may include a first and second motor drive each having a plurality of network ports. The network port at the controller device may be wired to a first network port of the first motor drive, and a second network port of the first motor drive may be wired to a first network port of the second motor drive.

The controller device may further include a plurality of network ports configured to wire to a network port of a plurality of motor drives. The networked automation system may include plurality of motor drives wired to the network port of the controller device.

Further, the subject technology includes a motor drive having a switch mode power supply coupled to a high voltage source. The switch mode power supply comprises a regulation circuit and at least one IN port configured to receive an auxiliary power via a network cabling. The auxiliary power is coupled to the regulation circuit of the switch mode power supply to allow the switch mode power supply to operate.

The switch mode power supply further may include an output and at least one OUT port, the at least one OUT port being coupled to the output of the switch mode power supply and configured to supply an auxiliary power via the network cabling.

In another aspect, the motor drive may include an isolating rectifier circuit, wherein the auxiliary power is received at the at least one IN port as alternating current and is coupled to the regulation circuit of the switch mode power supply as direct current.

The isolating rectifier circuit may be configured to limit voltage under fault conditions. In another aspect, the motor drive may include an isolating inverter circuit, wherein auxiliary power is fed from the output of the switch mode power supply as direct current and is converted to alternating current in the isolating inverter circuit, the isolating inverter circuit coupled to the at least one OUT port. The isolating inverter circuit may be configured to limit voltage under fault conditions.

In another aspect, the motor drive may include an isolating DC-DC converter circuit, wherein the auxiliary power is received at the at least one IN port as direct current and is coupled to the regulation circuit of the switch mode power as direct current. The isolating DC-DC converter circuit may be configured to limit voltage under fault conditions.

In another aspect, the motor drive may include an isolating DC-DC converter circuit, wherein auxiliary power is fed from the output of the switch mode power supply as direct current and is converted to direct current in the isolating DC-DC converter circuit, the isolating DC-DC converter circuit coupled to at least one OUT port. The isolating DC-DC converter circuit may be configured to limit voltage under fault conditions.

In another aspect, the motor drive may include data lines in electrical communication with the at least one IN port and in electrical communication with the center taps of at least one network transformer. The motor drive may include data lines in electrical communication with the at least one OUT port and in electrical communication with the center taps of at least one network transformer.

It should be appreciated that the subject technology can be implemented and utilized in numerous ways, including without limitation as a process, an apparatus, a system, a device, a method for applications now known and later developed. These and other unique features of the technology disclosed herein will become more readily apparent from the following description and the accompanying drawings.

BRIEF DESCRIPTION OF THE DRAWINGS

Various aspects of the present disclosure are discussed herein with reference to the accompanying Figures. It will be appreciated that for simplicity and clarity of illustration, elements shown in the drawings have not necessarily been drawn accurately or to scale. For example, the dimensions of some of the elements can be exaggerated relative to other elements for clarity, or several physical components can be included in one functional block or element. Further, where considered appropriate, reference numerals can be repeated among the drawings to indicate corresponding or analogous elements. For purposes of clarity, however, not every component can be labeled in every drawing. The Figures are provided for the purposes of illustration and explanation and are not intended as a definition of the limits of the disclosure.

DETAILED DESCRIPTION

Figure 1:
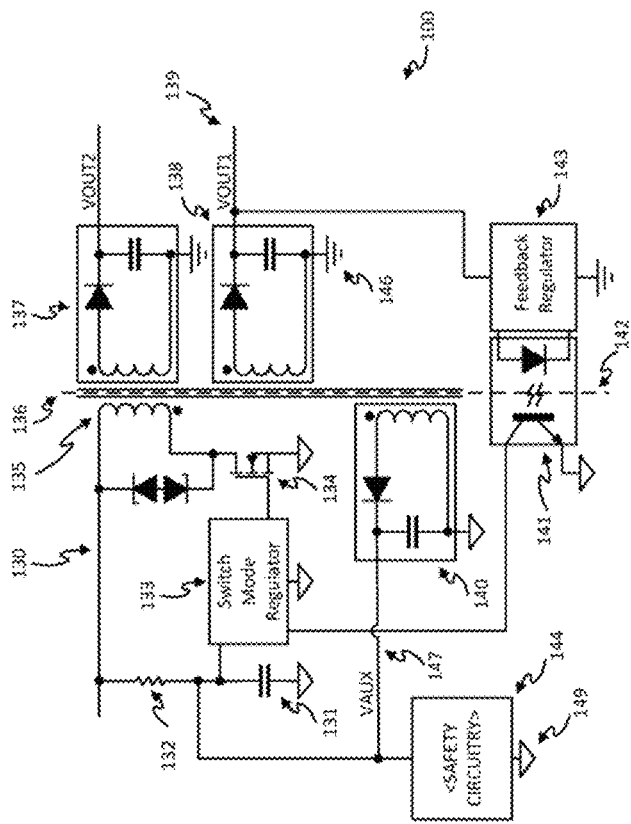
FIG. 1 is a prior art schematic illustrating an isolating, flyback supply operating from a HV DC bus with start-up power from the HV bus.

The subject technology overcomes many of the prior art problems associated with starting up switch mode power supplies that are operated from a wide-ranging bus voltage and it is particularly beneficial for starting supplies that incorporate functional safety features that limit the supply voltage in the event a fault or faults. The advantages, and other features of the technology disclosed herein, will become more readily apparent to those having ordinary skill in the art from the following detailed description of certain exemplary embodiments taken in combination with the drawings and wherein like reference numerals identify similar structural elements. It should be noted that directional indications such as upward, downward, right, left and the like, are used with respect to the figures and not meant in a limiting manner.

FIG. 1 shows an example switch mode power supply 100 connected to an HV source 130, either directly if the HV source or bus 130 is DC, or otherwise via a rectifier circuit (not shown) to create DC. The switch mode power supply typically has one closed-loop regulated output circuit 138 and zero, one or more transformer regulated output circuits 137. The supply 100 also includes a transformer regulated third output circuit 140 that creates a voltage VAUX 147 that provides steady-state power for the switch mode regulator control circuit 133. The switch mode regulator control circuit 133 in turn switches transistor 134 on and off using pulse width modulation (PWM) and thereby controls operation of the switch mode power supply 100. Operation of the switch mode power supply, with constant output voltages 139 and 147 is obtained by the switch mode regulator 133 operating in conjunction with the feedback regulator 143. The switch mode regulator control circuit 133 is typically realized using an integrated circuit such as the UC3842 made by Texas Instruments.

At power-up of the HV bus 130, there is no voltage across reservoir capacitor 131 and thus, before the switch mode power supply is operational, it is necessary to temporarily power the switch mode regulator control circuit 133 until the supply 100 has been operating long enough to power output circuits 137, 138, and 140. The usual technique for start-up includes trickle charging a reservoir capacitor 131 via a current limiter 132. The switch mode regulator control circuit 133 is arranged to draw a very low current, e.g., <200 µA, until a VAUX 147 has reached a threshold voltage of approximately 16V. The reservoir capacitor 131 is typically on the order of 150 µF and also has a low leakage current, e.g., <200 µA. Therefore the current limiter 132 must supply the total leakage current of <400 µA plus extra current to charge the reservoir capacitor 131. 1 mA is therefore a typical and practical current in limiter 132 at power up.

Consider further the design of the current limiter 132 of FIG. 1 using just a resistor. If the maximum operating voltage is 900V and the minimum operating voltage is 45V, this being a 20:1 range of supply voltage, then a resistor of 45V/1 mA=45 kΩ would serve as the limiter. The power consumption of a resistor used as a current limiter 132 is greatest when operating from 900V and is approximately 900V×900V/45 kΩ=18 W. Such a high dissipation is inefficient and therefore impractical. Therefore current limiter 132 can only implemented as a resistor in power supplies operating over a smaller range supply voltage such as 4:1 where a 1 W resistor is sufficient.

An alternative design for current limiter 132 is to use an active current source. Sattar [IXYS Publication IXAN0063 "Depletion-Mode Power MOSFETs and Applications"] teaches an efficient current limiter 132 implemented as a constant current source based on a depletion mode MOSFET, however, this technique is limited to less than 600V operation owing to the lack of depletion mode MOSFETs of higher voltage rating.

FIG. 1 shows a power supply 100 based on fly-back topology. Flyback is a preferred topology for supplies of less than 300 W, but the principles described herein for starting the feedback regulator 143 apply equally to other topologies such as the forward converter.

FIG. 1 further shows optional safety circuitry 144 that supervises the operation of the switch mode regulator 133. In order for safety circuitry 144 to operate predictably, the safety circuitry 144 includes a safe supply rail, i.e., having a limited voltage even under fault conditions. A resistor implementation of the current limiter 132 can safely limit the current, because a fault exclusion can be made for failure to short-circuit. However, as shown, a resistive current limiter is not suitable for such a wide range of operating voltages. An implementation of the current limiter 132 based on constant current circuits, e.g., using semiconductors, can fail to short-circuit and therefore cannot be considered to be safe in a fault condition. If safety circuitry 144 is present, then the switch mode regulator must be started from a voltage limited source.

Unitrode application note U-100A "UC3842/3/4/5 Provides Low-Cost Current-Mode Control" teaches a start-up technique using a resistor as a current limiter to trickle charge a capacitor and an auxiliary voltage from an auxiliary winding. U.S. Pat. Nos. 9,425,682; 9,048,747; 5,459,652; 6,125,046; 9,337,720; and 6,807,075 teach various trickle charging techniques. All of these methods are unsafe if the current limiter fails to short-circuit. Thus, a start-up circuit based on a current limiter circuit 132 that operates efficiently over the range of 45V to 900V DC, for trickle charging a reservoir capacitor 131, and which is safe in the presence of a fault, is beneficial.

In one embodiment, the start-up power source delivers approximately 1 mA at approximately 24V to charge the reservoir capacitor 131 of FIG. 1. If safety circuitry 144 is present, then further current is required, but in modern circuits, the further current can be as little as 4 mA. Therefore a representative specification for the start-up power is 4 mA at 24V or approximately 100 mW.

Figure 3:
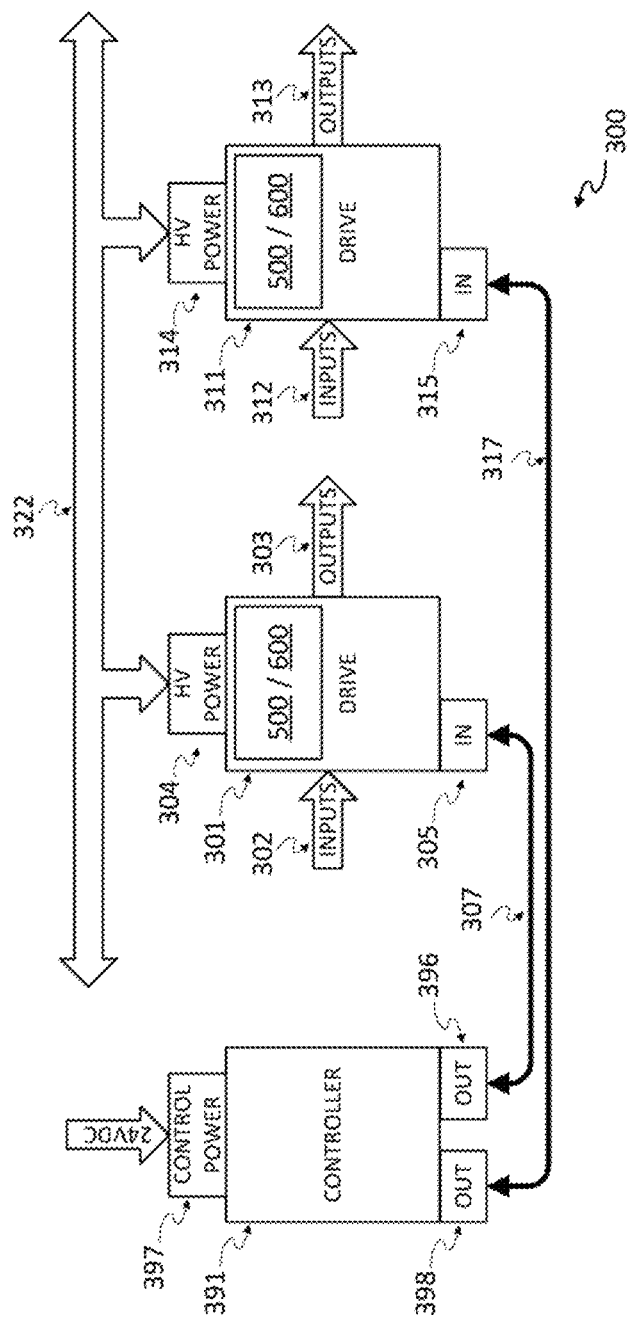
FIG. 3 is a schematic including two drives operated from a HV power line with a star or tree topology network connection to a controller.
Figure 4:
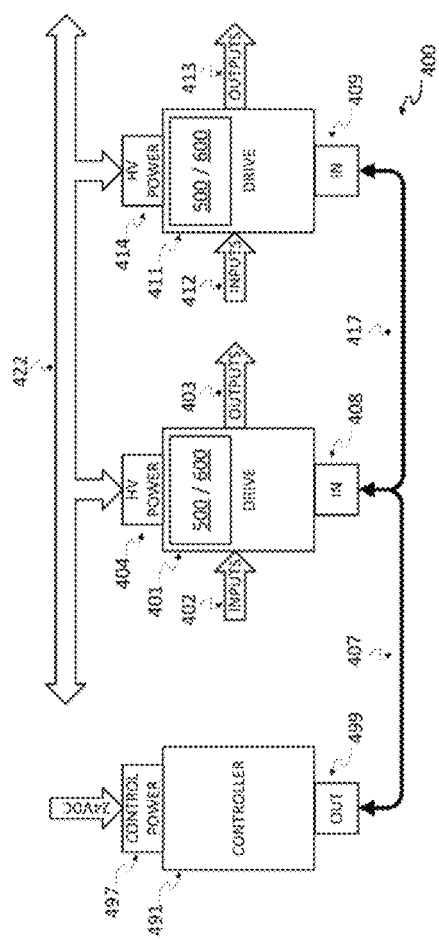
FIG. 4 is a schematic including two drives operated from a HV power line with a multidrop network connection to a controller.

Modern automation equipment including electric motor drives, hereafter referred to as 'drives', are controlled and monitored by a communications network, also called a field bus. Several networking arrangements are shown in FIGS. 2-4.

Figure 2:
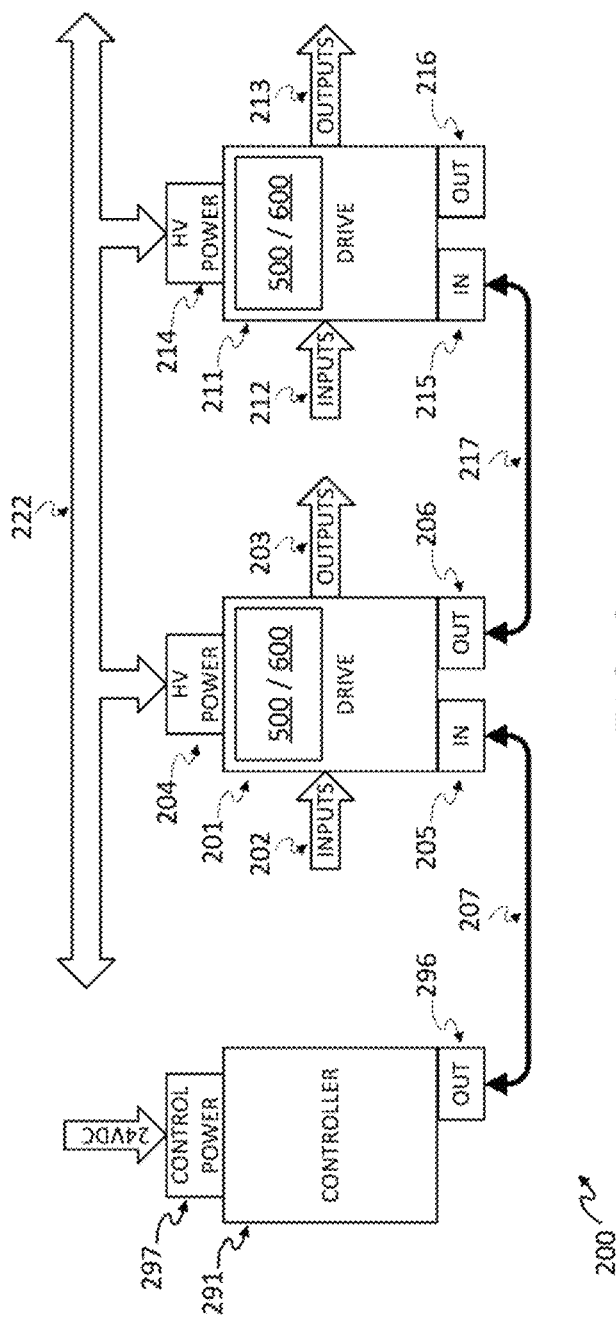
FIG. 2 is a schematic including two drives operated from a HV power line with a line topology network connection to a controller.

FIG. 2 schematically represents a networking arrangement 200 having a controller 291 connected to a first drive 201 via a network cable 207. Controller 291 can include a network device. Hereafter, the term 'controller' is extended to mean any upstream network device sending start-up power to the first drive 201. A network device connected to the IN port 205 of drive 201 is termed upstream and a network device connected to an OUT port 206 is termed a downstream device.

Controller 291 may include a controller device such as a PLC, or other field bus device, or a network device such as a network router or a network switch. The first drive 201 is further connected to a second drive 211 via a second network cable 217. This arrangement can be extended to further electric motor drives or other automation equipment via OUT port 216 of the second drive 211. The cabling arrangement of FIG. 2 is typical of networks that use point-to-point Ethernet physical layers, such as 100Base-TX, in a line topology. EtherCAT is an example of this type of network. A ring topology connection is a variant of FIG. 2, but with a further network cable (not shown) connecting the OUT port 216 to an IN port (not shown) at controller 291. FIG. 2 can be elaborated to a tree topology connection by having at least some drives with more than one OUT port (not shown) connected to further drives (not shown).

Each drive 201, 211 also has respective inputs 202, 212 that include position feedback, and outputs 203, 213 that include the motive power and brake power for an electric motor (not shown). However, only an HV power bus 222 powers the drives 201, 211. In this regard, each drive 201, 211 derives control power from the HV bus 222 via a high voltage, motive power port 204, 214 using a switch mode power supply 100, such as that of FIG. 1.

Still referring to FIG. 2, only the network cables 207, 217 link the drives 201, 211 directly or indirectly to the controller 291. The pre-existing network cables 207, 217 provide pathways for the start-up power without the encumbrance of adding dedicated cables and connectors that would otherwise be required for transmitting start-up power to the drives 201, 211. The network cables 207, 217 may simple be wires. Each network cable 207,217 may carry as little as 100 mW of start-up power. The terms IN port and OUT port are commonplace terms used in field busses for network ports. In the networking arrangement 200, the OUT port transmits start-up power and the IN port receives start-up power.

Modern network cables, particularly Ethernet cables used in industry, often have only twisted pairs used for communication with no extra lines. IP68 field bus cables are usually two-pair cables with 4-pin M8 connectors. There are also field re-wirable 8P4C connectors that have just two pairs. Therefore, a scheme for sending start-up power using the pre-existing communication conductors of a network cable, namely a power over data lines (PODL) scheme, has the broadest scope for use.

The controller 291 receives power at the control power port 297 from a source 223 that is distinct from the HV bus 222. For example, the source 223 is 24 VDC derived from a PELV/SELV or like supply. The controller 291 sends approximately 100 mW of start-up power at the OUT port 296 and drive 201 receives the 100 mW of start-up power at the IN port 205. Similarly, drive 201 sends 100 mW of start-up power at the OUT port 206 so that drive 211 receives 100 mW of start-up power at the IN port 215. Thus, controller 291 is a supplier of start-up power, whereas in the general case, a drive such as 201 is both a consumer of start-up power at via IN port 205 and a supplier of start-up power at via OUT port 206.

Referring now to FIG. 3, another embodiment of a networking arrangement 300 in accordance with the subject technology is shown. Similar elements to those described in connection with above-described embodiments are indicated with the like reference numbers. Many elements are essentially the same as those of the foregoing embodiments and, thus, are not further described herein. The following description is directed to the primary differences between the networking arrangements 200, 300.

The controller 391 connects to a first drive 301 via a network cable 307. However, the controller 391 is further connected directly to the second drive 311 via a second network cable 357. Such connections could also be extended to further electric motor drives or other automation equipment via additional OUT ports (not shown) of the controller 391. The cabling arrangement of FIG. 3 is preferable for networks that use point-to-point Ethernet physical layers, such as 100Base-TX, in a star or tree topology. Profinet is an example of this type of network. The tree topology of FIG. 3, may be elaborated by further OUT ports on the drives (not shown) fanning out to a further tier of drives (not shown).

The controller 391 sends 100 mW of start-up power at each of the OUT ports 396, 398, whereas drives 301 and 311 each receives 100 mW of start-up power at the respective IN ports 305, 315. Each network cable 307 and 357 carries only ~100 mW of start-up power.

Referring now to FIG. 4, still another embodiment of a networking arrangement 400 in accordance with the subject technology is shown. Similar elements to those described in connection with above-described embodiments are indicated with the like reference numbers. Many elements are essentially the same as those of the foregoing embodiments and, thus, are not further described herein. The following description is directed to the primary differences of networking arrangement 400 as compared to the networking arrangements 200, 300.

The controller 491 connects to a first drive 401 via a network cable 407. The first drive 401 is further connected to a second drive 411 via a second network cable 417. The connections can be extended to further electric motor drives or other automation equipment via the IN port 409 of the second drive 411. The cabling arrangement of FIG. 4 is preferably for networks that use multi-drop, daisy-chained, physical layers, such as 10BASE-T1S, CAN and RS-485.

In one embodiment, the controller 491 sends approximately 200 mW of start-up power at the OUT port 499, whereas drives 401 and 411 each receive approximately 100 mW of start-up power at the respective IN ports 408, 409. The network cable 407 carries about 200 mW of start-up power whereas network cable segment 417 carries only about 100 mW of start-up power.

The IN ports 205, 215 of FIG. 2, the IN ports 305, 315 of FIG. 3, and the IN ports 408, 409 of FIG. 4 are all ports that receive start-up power. Comparing FIG. 2, FIG. 3, and FIG. 4 from the viewpoint of sending start-up power, the topology of FIG. 2 is the most scalable to systems with a large count of drives because each device only has to transmit start-up power to the neighboring node.

There are various methods for coupling start-up power onto the network cables 207, 307, 407, 217, 357, 417. Certain multi-drop networks, such networks using the CANopen communication protocol, have provisions for a small amount of low voltage DC power on dedicated lines of the network cable 407, 417. This low voltage DC power is normally used to power the cable side of isolating transceivers, but can serve equally for sending start-up power. However networks based on Ethernet physical layers will comprise one or more signal pairs that are coupled to transformers at each end but it is possible to transfer start-up power using the signal pairs.

Figure 7:
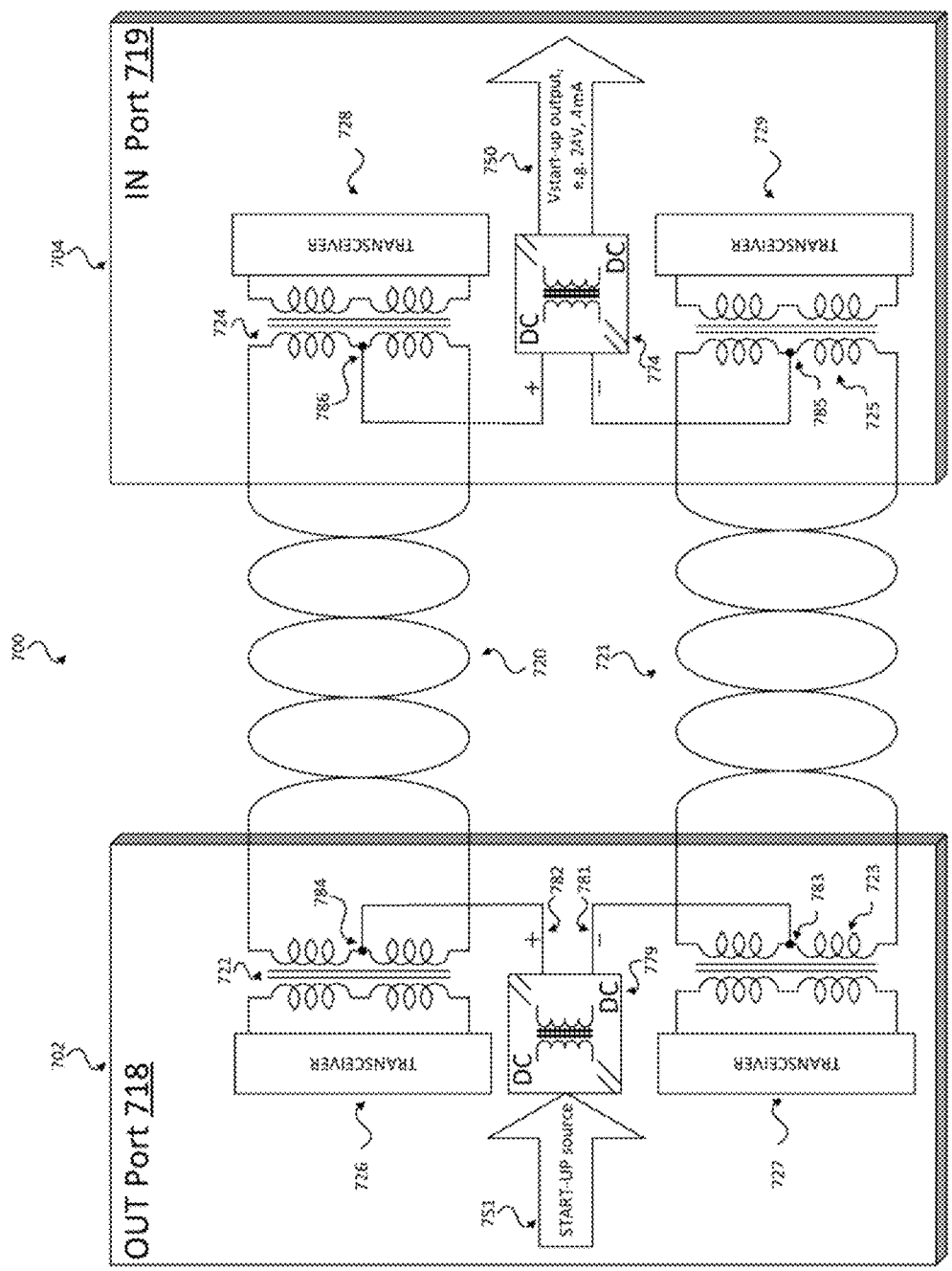
FIG. 7 is a schematic illustrating a network connection between a first network device and a second network device, showing start-up power supplied as a DC voltage on two twisted pairs in accordance with the subject technology.

Referring now to FIG. 7, a schematic 700 illustrating a network connection between a first network device 702 and a second network device 704 with start-up power supplied as a DC voltage on two pairs 720, 721 of twisted wires in accordance with the subject technology is shown. The arrangement of schematic 700 exemplifies DC start-up power over network cables of the at least two pairs 720, 721. The schematic 700 illustrates the connection between an upstream device 702 and a downstream device 704.

The upstream device 702 may be a controller device or a motor drive. Typically, the downstream device 704 is a motor drive. The upstream device 702 includes an OUT port 718 that corresponds to the controller OUT port 396. The downstream device 704 includes an IN port 719 that corresponds to the drive IN ports 305.

Referring to the OUT port 718 of the upstream device 702, a DC start-up power source 751 supplies DC power to an isolating DC-DC converter 779. The DC start-up power source 751 may be internal in a drive or controller, or supplied externally. The OUT port isolating DC-DC converter 779 includes outputs 781, 782 connected to center taps 783, 784 of network transformers 722, 723. At the IN port 719 of the downstream device 704, an IN port isolating DC-DC converter 774 draws power from twisted pairs 720, 721 of the network cable via the center taps 785, 786 of network transformers 724 and 725, and thereby the IN port isolating DC-DC converter 774 outputs start-up power 750. The start-up power 750 may be provided to a switch mode power supply such as supply (the box marked 500/600) within drive 201 of FIG. 2.

Figure 5:
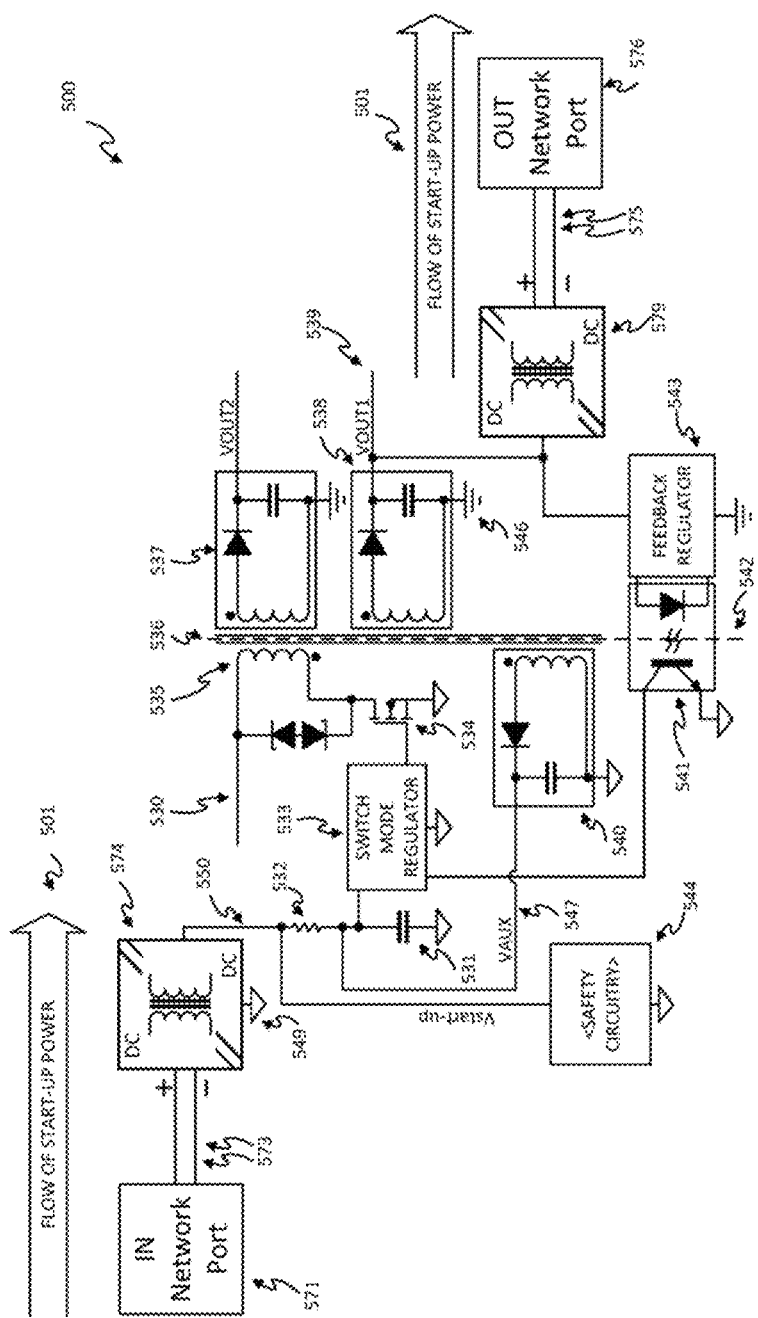
FIG. 5 is a schematic illustrating an isolating, flyback supply operating from an HV DC bus with DC start-up power supplied from a first network port and further DC start-up power supplied to a second network port in accordance with a first implementation of the subject technology.

Alternatively, the start-up power 750 may be provided to an isolating, flyback supply 500 as shown in FIG. 5. With reference to FIG. 5, similar elements to those described in connection with the embodiment of FIG. 1 are indicated with the like reference numbers. Many elements are essentially the same as those of the foregoing embodiments and, thus, are not further described herein. The following description is directed to the primary differences of flyback supply 500 as compared to supply 100.

The supply 500 incorporates networked start-up power interfaces. It is envisioned that a plurality of drives could be connection together so that every drive has a start-up power receiving device at its IN port, and a drive may also supply start-up power to its neighboring drive at its OUT port. Any given drive may have all of the elements of the supply 500 of FIG. 5 or be different.

Still referring to FIG. 5, the start-up power receiving IN port 571 of FIG. 5 could corresponds to any of ports 205, 215, 305, 315, 408, 409, 719 described above. The flow of start-up power is from left to right as illustrated by arrows 501. Input start-up power lines 573 are derived from the start-up power receiving port 571 and, depending upon the network physical layer, are either floating or referred to a touchable earth potential. The input start-up power lines 573 feed an IN port isolating DC-DC converter 574, corresponding to converter 774 in FIG. 7 for example.

The DC-DC converter 574 supplies Vs art-up via rail 550. In other words, the IN port isolating DC-DC converter 574 transfers and isolates the incoming start-up power to a start-up power rail Vstart-up 550 that is referred to a reference voltage 549 of the primary side circuit of the switch mode power supply 500. Unlike FIG. 1, it will be seen that Vstart-up 550 is not derived from the bus voltage 130/530 but instead is supplied via the IN port 571. Isolation may be an electrical safety requirement, for example, because reference voltage 549 may include lethal voltage. As such, the start-up power rail 550 is said to be 'hot-to-bus'. The start-up power rail 550 is by way of example 24V DC. The current limiter 532 forming a trickle charge circuit may be embodied as a physically small resistor with a rating of less than 100 mW because 24V×1 mA=24 mW.

Figure 12:
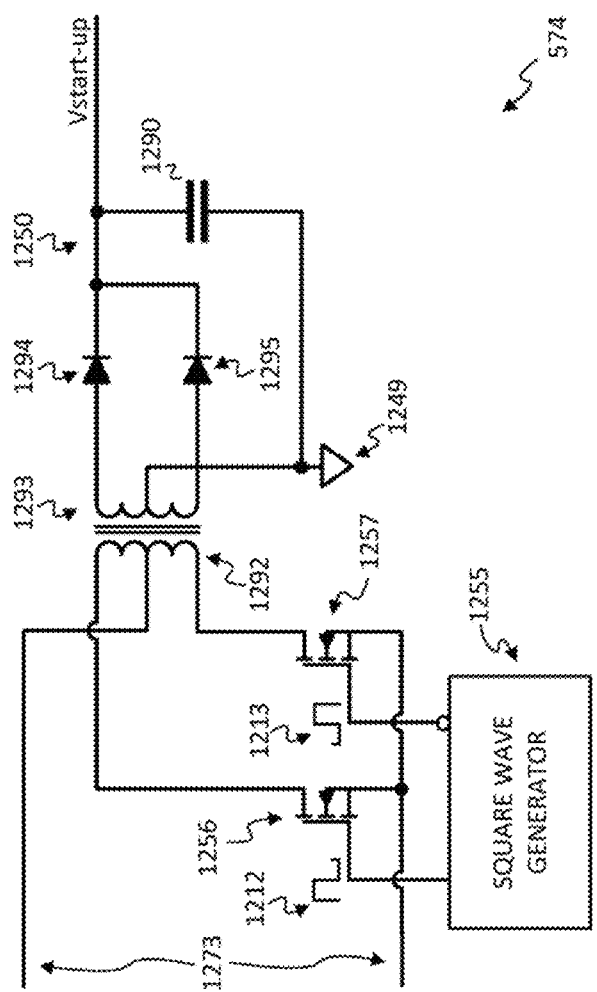
FIG. 12 is a schematic including the OUT port isolating DC-DC converter of FIG. 5 for receiving start-up power at an IN port or sending start-up power at an OUT port as a DC voltage in accordance with the first implementation of the subject technology.

The IN port isolating DC-DC converter 574 may be realized in various ways. An exemplary circuit is shown in FIG. 12. In the DC-DC converter 574 of FIG. 12, a square wave generator 1255 provides normal signal 1212 and an inverted signal 1213 to the gates of transistors 1256, 1257 that drive opposite ends of a center tapped transformer primary winding 1292. The center tapped secondary transformer winding 1293 is coupled to a full-wave rectifier circuit 1294, 1295, and subsequently smoothed at capacitor 1290. DC output 1250 in FIG. 12 corresponds to the start-up power rail 550 in FIG. 5. Square wave generator 1255 is not described in detail but there are many integrated circuits, such as the CD4047 made by Texas Instruments, which are suitable. The isolating DC-DC converter of FIG. 12 is voltage limiting, i.e., the output voltage at line 1250 is never more than the peak of the input voltage 1273 multiplied by the turns ratio of transformer 1293.

It should be understood by one having ordinary skill in the art that there are many alternative circuits for realizing an isolating DC-DC converter 574 of FIG. 5. If the drives contain safety circuitry 544, then it is preferable to arrange a chain of converters that transmit start-up power to be functionally safe, i.e., each converter is voltage limiting even in a fault condition or an accumulation of fault conditions. The IN port isolating DC-DC converter 574 of FIG. 12 has a limited output voltage even in a fault condition because the output voltage is never more than the input voltage as shown by potential difference 1273 multiplied by the turns ratio of the transformer 1292, 1293.

Still referring to FIG. 5, the high voltage switch mode power supply 500 contains an OUT port isolating DC-DC converter 579 that is powered from an output power rail 539. The OUT port isolating DC-DC converter 579 can be realized in the manner of IN port isolating DC-DC converter 574, including that shown in FIG. 12. The output lines 575 of the OUT port isolating DC-DC converter 579 are coupled to the network at the OUT network port 576 to send start-up power. The OUT port isolating DC-DC converter 579 of FIG. 5 corresponds to element 779 of FIG. 7.

For reference, every controller is a start-up power sending device. The input power in a controller is provided at its control power input port which is then coupled (not shown in a figure) to a DC-DC converter such as converter 579. In one embodiment, the controller has a DC-DC converter 579, coupled via output lines 575 to a start-up power sending OUT port 576 as shown in FIG. 5.

In a second implementation of the subject disclosure, start-up power is transferred as alternating current (AC). The power may be transferred via sending the AC signal over two twisted communication pairs.

Figure 8:
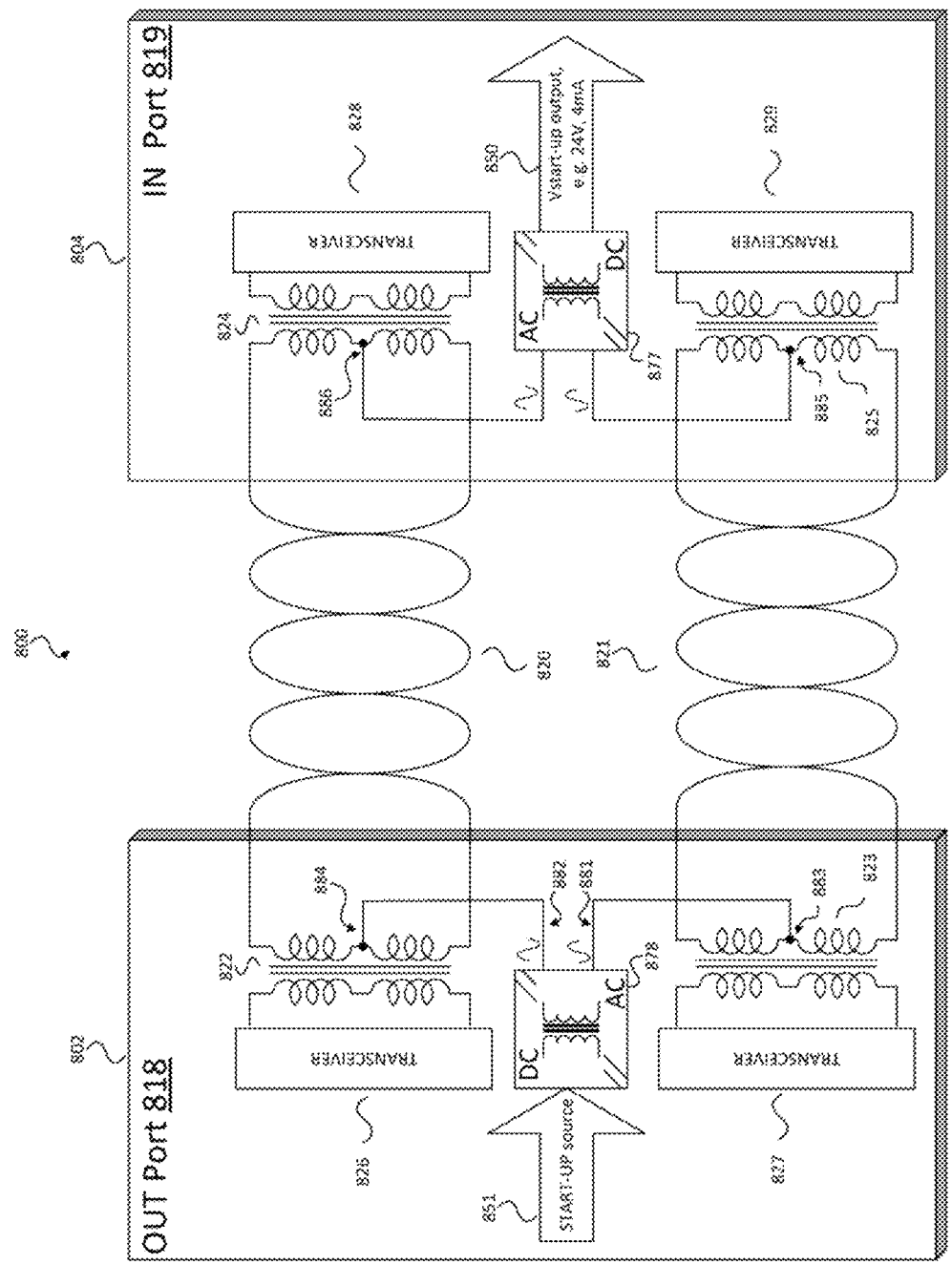
FIG. 8 is a schematic illustrating a network connection between a first network device and a second network device, showing start-up power supplied as an AC voltage on two twisted pairs in accordance with the second implementation of the subject technology.

Referring now to FIG. 8, another schematic 800 illustrating a network connection arrangement in accordance with the subject disclosure is shown. Similar elements to those described in connection with above-described embodiments of FIG. 7 are indicated with the like reference numbers. Many elements are essentially the same as those of the foregoing embodiments and, thus, are not further described herein. The following description is directed to the primary differences between the arrangements 700, 800.

The primary difference of schematic 800 is the use of AC start-up power over network cables 820, 821 with at least two pairs. For example, the OUT port 818 of an upstream device corresponds to the controller OUT port(s) 296, 396, 398 or the drive OUT port 206, 216. The IN port 819 of a downstream device may correspond to drive IN port 205, 215, 305, 315.

With regard to the OUT port 818, DC start-up power 851 is coupled to the cables of the isolating DC-AC inverter 878 of the OUT port 818. The DC start-up power 851 is either generated internally in the drive's switch mode power supply or in the case of a controller, the DC start-up power 851 is preferably supplied externally. The OUT port isolating DC-AC inverter 878 includes AC outputs 881, 882 coupled to the center taps 883, 884 of the network transformers 822, 823. At the IN port 819 of the downstream device 819, an IN port isolating AC-DC converter 877 draws AC power from network cable twisted pairs 820, 821 via the center taps 885, 886 of transformers 824, 825, and thereby outputs start-up power via start-up rail 850 to the switch mode power supply 600 as shown, for example, in FIG. 6 at start-up power rail 650. The coupling scheme of FIG. 8 is general in concept, and the power transmission simply relies on the presence of two twisted pairs without particular regard to the physical layers in use.

Figure 6:
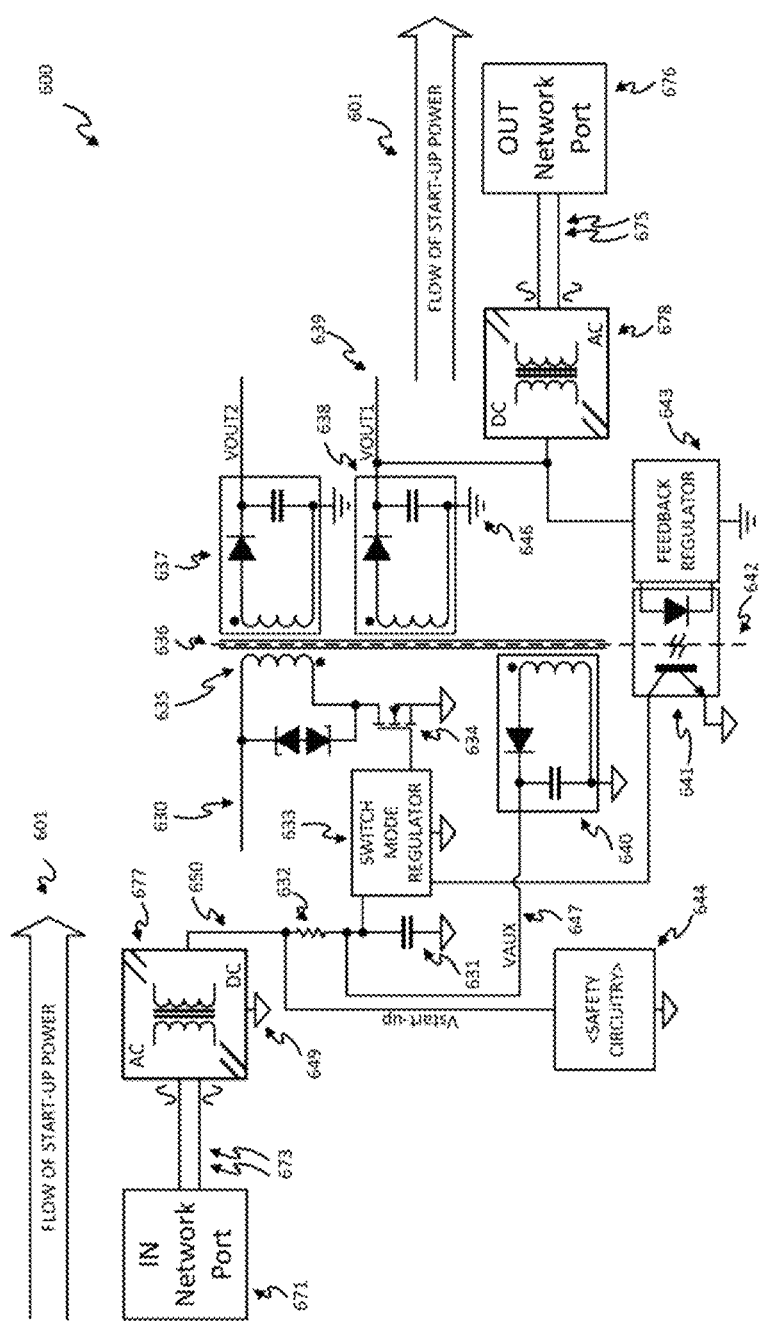
FIG. 6 is a schematic illustrating an isolating, flyback supply operating from a HV DC bus with AC start-up power supplied from a first network port and further AC start-up power supplied to a second network port in accordance with a second implementation of the subject technology.

Referring in more detail to FIG. 6, another embodiment of a switch mode power supply 600 is shown. Similar elements to those described in connection with above-described embodiments of FIG. 5 are indicated with the like reference numbers. Many elements are essentially the same as those of the foregoing embodiments and, thus, are not further described herein. The following description is directed to the primary differences between the arrangements 100, 500, 600. Typically, each drive is a start-up power receiving device, and each drive may also supply start-up power to a neighboring drive.

The start-up power receiving IN port 671 of FIG. 6 may correspond to ports 205, 215, 305, 315, 408, 409, 719. Input start-up power lines 673 are derived from the start-up power receiving IN port 671 and, depending upon the network physical layer, are either floating or referred to a touchable earth potential. The input start-up power lines 673 are connected to IN port isolating AC-DC converter 677, corresponding to AC-DC rectifier 877 in FIG. 8. The IN port isolating AC-DC converter 677 transfers and isolates the incoming start-up power to the start-up power rail 650 that is referred to reference voltage 649 of the primary side circuit of the switch mode power supply 600. Isolation may be an electrical safety requirement because reference voltage 649 may include a lethal voltage. The start-up power rail 650 is approximately 24V DC. The current limiter 632 of a trickle charge circuit can be embodied as a physically small resistor.

In FIG. 6, an output power rail 639 of the high voltage switch mode power supply powers an OUT port isolating DC-AC inverter 678. The AC outputs of the OUT port isolating DC-AC inverter 678 are coupled to a start-up power sending port 676. Item 678 of FIG. 6 corresponds to DC-AC inverter 878 of FIG. 8.

Figure 11:
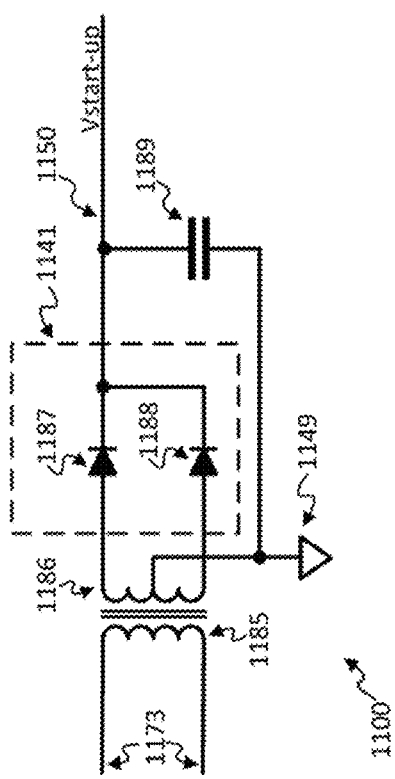
FIG. 11 is a schematic including an IN network port (hereafter simply IN port or as OUT port) isolating AC-DC converter of FIG. 6 for receiving start-up power as an AC voltage in accordance with the second implementation of the subject technology.

Referring now to FIG. 11, a schematic 1100 of an IN port isolating AC-DC converter is shown, which can correspond to isolating AC-DC converter 677 in FIG. 6 and/or isolating AC-DC converter 877 in FIG. 8. AC power 1173 is presented to the primary winding 1185 of a transformer 1133 whose secondary winding 1186 is connected to two diodes 1187, 1188. The diodes 1187, 1188 are connected to form a full wave rectifier 1141. The reference voltage to ground 1149 of the IN port isolating AC-DC converter 1100 is connected to the center tap 1149 of the secondary winding 1186. A capacitor 1189, also connected to ground 1149, smoothes an output voltage on line 1150.

In another implementation, the IN port isolating AC-DC converter 1100 may further provide output rails from additional secondary windings. Equivalent implementations of FIG. 11 are possible using bridge rectifiers. Preferably, the IN port isolating AC-DC converter 1100 of FIG. 11 is voltage limiting, i.e., the output voltage at fine 1150 is never more than the peak of the input voltage 1173 multiplied by the turns ratio of windings 1185, 1186.

Figure 10:
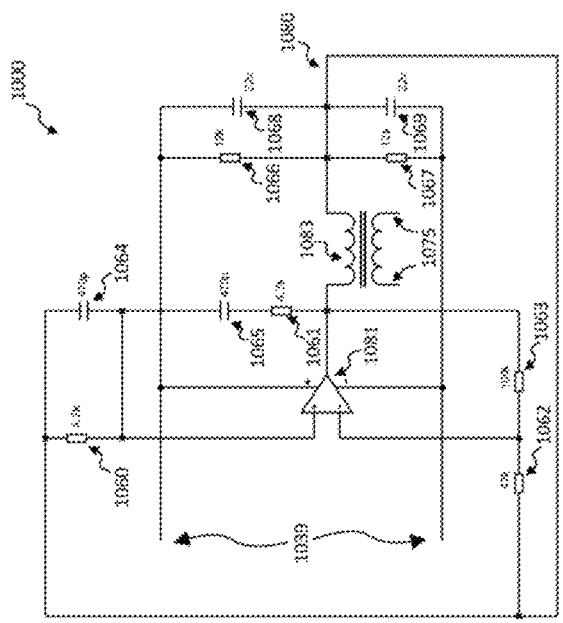
FIG. 10 is a schematic including an OUT network port isolating DC-AC inverter of FIG. 6 for sending start-up power as an AC voltage in accordance with the second implementation of the subject technology.

FIG. 10 is a schematic 1000 of an example OUT port isolating DC-AC inverter circuit such as DC-AC inverter 878 of FIG. 8. Input power rails 1039 either correspond to the output power rail 639 and ground 646 of FIG. 6, or may be otherwise derived in the case of a controller such as from a 24V input to the controller. Resistors 1066, 1067 and capacitors 1068, 1068 create a mid-point supply rail 1080. Resistors 1060, 1061, 1062, 1063, capacitors 1064, 1065, and op-amp 1081 form a Wien bridge oscillator for creation of a sine wave. Thus, the output of op-amp 1081 is a sinewave with a peak-to-peak amplitude almost equal to the voltage of the incoming supply rail 1039. The sinewave drives the transformer primary winding 1083 with respect to the supply mid-point rail 1080. The output of the circuit is available at the secondary transformer winding 1075 which, for example, corresponds to AC output lines 675 in FIG. 6. The component values of FIG. 10 are merely exemplary. As shown, the circuit will oscillate at 60 kHz, a practical value that allows the use of compact transformers. The isolating DC-AC inverter of FIG. 10 is voltage limiting, i.e., the output voltage at line 1075 is never more than the peak of the input voltage 1039 multiplied by the turns ratio of transformer 1083.

There are many alternative ways of implementing an DC-AC inverter but the simple DC-AC inverter circuit 1000 of FIG. 10 has many advantages. The DC-AC inverter circuit 1000 is linear and therefore low noise. The low power requirements for start-up power mean that the losses of a linear amplifier are not a concern. Also, the Wien bridge oscillator is configured so that at start-up, the sinewave starts with a small amplitude and then grows until the sinewave is limited by the amplitude of the supply rail 1039. This soft-start avoids a start-up saturation of the transformer 1083.

Further advantages are that the DC-AC inverter circuit 1000 are low-cost and that the output is slew-rate limited. Network transceiver circuits are capable of rejecting common mode noise but only up to a certain maximum dV/dt. AC power coupled to the network wires, such as that in FIG. 8, is in effect a common mode signal and must be rejected by the transceivers 826, 827, 828, 829. Therefore, the slew rate limited output at winding 1075 in the circuit 1000 ensures that the transmission of AC power will not interfere with network communication. It is also envisioned that OUT port isolating DC-AC inverter circuit 1000 of FIG. 10 has a limited output voltage even in a fault condition because the output voltage is never more than input voltage at 1039 multiplied by the turns ratio of the transformer.

The subject technology is adaptable and includes many different variants. For example, DC power is transmitted over a single pair of data lines. The DC, single pair, power coupling are applicable to the network configurations of FIG. 2, FIG. 3, and FIG. 4.

In another embodiment illustrated by schematic 900, AC power can be transmitted via a single twisted pair 961 in combination with a cable shield 954, which is the primary difference of schematic 900 as compared to schematic 800, wherein like reference numbers are used to identify similar structures. OUT port 918 may correspond to the controller OUT ports 296, 396, 397, 499 or the drive OUT port 206, 216. Port 919 may correspond to the drive IN port 205, 215, 305, 315.

Figure 9:
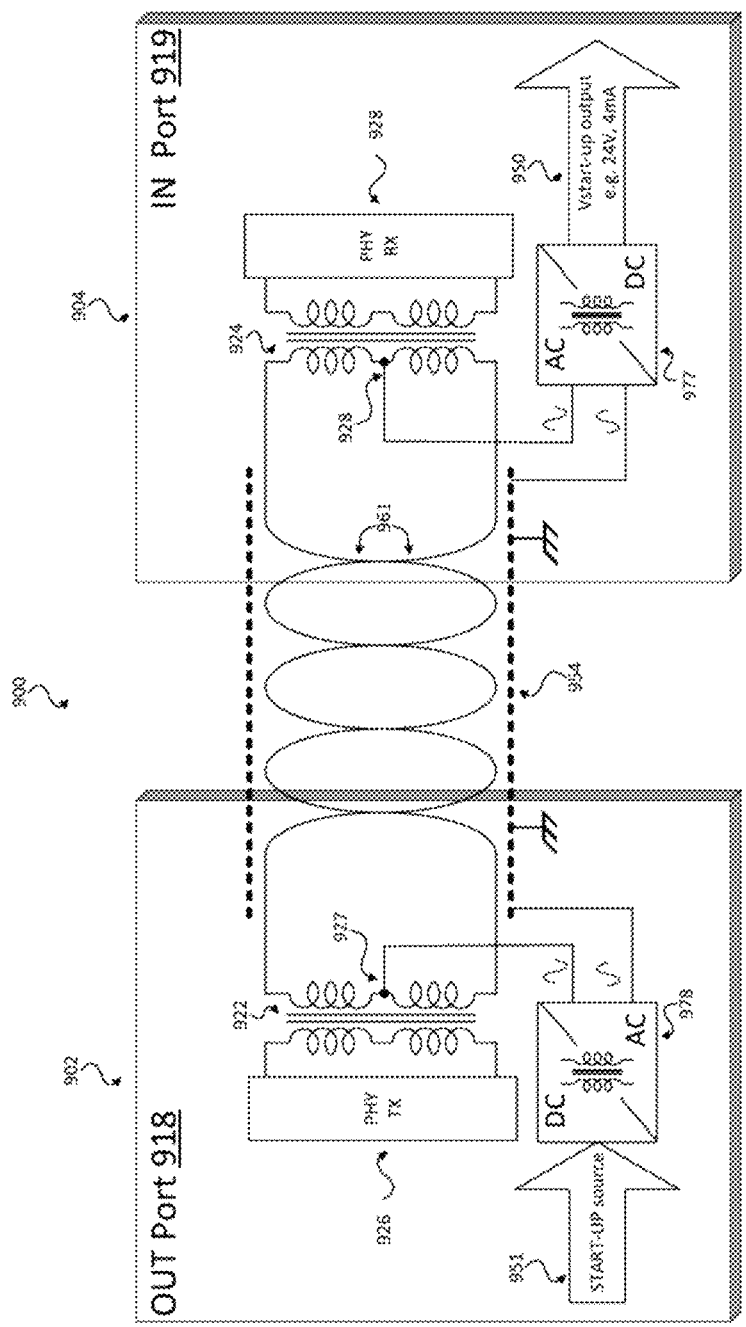
FIG. 9 is a schematic illustrating a network connection between a first network device and a second network device, showing start-up power supplied as an AC voltage on one twisted pair and a cable shield in accordance with the first and second implementations of the subject technology.

At OUT port 918, start-up power 951, e.g. 24V DC, is supplied to an isolating DC-AC inverter 978. Outputs of the OUT port isolating DC-AC inverter 978 are coupled to the center tap 927 of network transformer 922 and cable shield 954. At IN port 919, an IN port isolating rectifier 977 draws power from the center tap 928 of transformer 924 and the cable shield 954. The AC, one twisted pair, power transfer method of FIG. 9 is applicable to many circuits including the network configurations of FIGS. 2-4. Other power coupling methods can also be used to transmit the AC power.

By substituting DC-DC converters for elements 978, 977, DC power can also be transmitted via a single twisted pair in combination with a cable shield as shown in FIG. 9. In another embodiment, the spare lines or conductors dedicated to the transfer of power may be used to send start-up power rather than using twisted pairs such as shown in FIGS. 7 and 8.

Referring back to FIGS. 5 and 6, the power supplies show two outputs and an auxiliary output, but there may be more or fewer output circuits. FIG. 1 shows a fly-back circuit, which is a preferred topology at powers of less than 200 W, but other topologies such as the forward converter may be used.

The coupling scheme of FIGS. 7 and 8 is general in concept and the power transmission simply relies on the presence of two twisted pairs without particular regard to the physical layers in use. An exemplary physical layer may include an implementation where transceivers 726, 727 include transmit and receive portions of a first 100Base-TX physical layer (PHY), and likewise transceivers 724, 725 include receive transmit and portions of a second 100Base-TX PHY. There are many other possible use cases including but not limited to 100Base-T1, RS485, and so forth. Any of the start-up power transfer methods described herein are applicable to network configurations of FIGS. 2-4 and the like.

The start-up power sent in the subject exemplary embodiments is small. The start-up power sent can be reduced further by disabling or de-powering a transmitter circuit of element 779, 878, 978 after a certain time has lapsed, or when communication from the downstream device has been detected. The transmitter device can also be operated intermittently to reduce the start-up power required.

Referring to FIGS. 5 and 6 again, it is alternatively possible to power the primary side control circuit of the switch mode supply continuously and solely from the network cabling because the control power requirement is typically less than 1 W. To adapt the supplies 500, 600 to accept, start, and run control power from the network, the auxiliary output circuit 540, 640 may be removed and a link may be introduced across current limiter 532, 632.

It will be appreciated by those of ordinary skill in the pertinent art that the functions of several elements can, in alternative embodiments, be carried out by fewer elements, or a single element. Similarly, in some embodiments, any functional element can perform fewer, or different, operations than those described with respect to the illustrated embodiment. Also, functional elements shown as distinct for purposes of illustration can be incorporated within other functional elements in a particular embodiment. For example, the features of the claims and as disclosed herein can be combined in any combination.

While the subject technology has been described with respect to various embodiments, those skilled in the art will readily appreciate that various changes and/or modifications can be made to the subject technology without departing from the scope of the present disclosure.

LIST OF REFERENCE NUMERALS

130 HV bus positive
131 Reservoir capacitor used for start-up
132 Current limiter for trickle charge circuit
133 Control circuit for high voltage switch mode power supply
134 Primary transistor of high voltage switch mode power supply
135 Primary winding of the transformer of the high voltage switch mode power supply
136 Transformer of the high voltage switch mode power supply
137 Winding, rectifier and smoothing capacitor used to create the second supply output VOUT2
138 Winding, rectifier and smoothing capacitor used to create the main, regulated supply output VOUT1
139 The main, regulated supply output VOUT1
140 Winding, rectifier and smoothing capacitor used to create auxiliary supply voltage VAUX
141 Isolator in the path of the power supply feedback
142 Isolation barrier
143 Feedback regulator closing the current loop between VOUT1 and the PWM of the primary transistor
144 Optional safety circuit
146 Reference potential, associated with the safe, touchable, outputs of the high voltage switch mode power supply
147 Auxiliary power rail, VAUX, used to sustain operation of high voltage switch mode supply
149 HV bus negative, reference potential of the primary side of the high voltage switching regulator
200 High voltage DC bus
201 First drive
202 Inputs of the first drive
203 Outputs of the first drive
204 High voltage, motive power port of the first drive
205 Network IN port of the first drive
206 Network OUT port of the first drive
207 First network cable
211 Second drive
212 Inputs of the second drive
213 Outputs of the second drive
214 High voltage, motive power port of the first drive
215 Network IN port of the second drive
216 Network OUT port of the second drive
217 Second network cable
291 Controller
296 Network OUT port of the controller
297 Input for control power to the controller
398 Second network OUT port of the controller
408 Network OUT port of the first drive
409 Network IN port of the second drive
499 Network IN port of the controller
550 Start-up power at the point of use, Vstart-up
571 IN network port that receives start-up power
573 Input start-up power lines from the power receiving network port
574 IN port isolating DC-DC converter
575 Output start-up power lines to the power transmitting OUT port
576 OUT network port that sends start-up power
579 OUT port isolating DC-DC converter
677 IN port isolating rectifier circuit, AC to DC converter
678 OUT port isolating DC-AC inverter
718 IN network port of the downstream, farther from the controller, device
719 OUT network port of the upstream, nearer to the controller, device
720 First twisted pair of a network cable
721 Second twisted pair of a network cable 722 First network transformer of the IN port of the upstream device
723 Second network transformer of the IN port of the upstream device
724 First network transformer of OUT port of the downstream device
725 Second network transformer of OUT port of the downstream device
726 First transceiver of the OUT port of the upstream device
727 Other half of the first transceiver or the second transceiver of the OUT port of the upstream device
728 First transceiver of the IN port of the downstream device
729 Other half of the first transceiver or the second transceiver of the IN port of the downstream device
751 Start-up power generated by or conditioned within the upstream device
954 Shield of the network cable
1060 First resistor in Wien bridge of isolating DC-AC inverter
1061 Second resistor in Wien bridge of isolating DC-AC inverter
1062 First gain-setting resistor of isolating DC-AC inverter
1063 Second gain-setting resistor of isolating DC-AC inverter
1064 First capacitor in Wien bridge of isolating DC-AC inverter
1065 Second capacitor in Wien bridge of isolating DC-AC inverter
1066 First resistor in mid-point sub-circuit of isolating DC-AC inverter
1067 Second resistor in mid-point sub-circuit of isolating DC-AC inverter
1068 First capacitor in mid-point sub-circuit of isolating DC-AC inverter
1069 Second capacitor in mid-point sub-circuit of isolating DC-AC inverter
1080 Mid-point voltage of the isolating DC-AC inverter
1081 Operational amplifier of the isolating DC-AC inverter
1083 Transformer of the isolating DC-AC inverter
1141 Full-wave rectifier
1185 Primary winding of the transformer of the isolating rectifier circuit
1186 Secondary winding of the transformer of the isolating rectifier circuit
1187 First rectifier of the full-wave rectifier circuit within the transformer of the isolating rectifier circuit
1188 Second rectifier of the full-wave rectifier circuit within the transformer of the isolating rectifier circuit
1189 Output smoothing capacitor of the isolating rectifier circuit
1255 Complementary square wave generator circuit
1256 First transistor of the primary circuit of the isolating DC-DC converter
1257 Second transistor of the primary circuit of the isolating DC-DC converter
1290 Output smoothing capacitor of the isolating DC-DC converter
1292 Primary winding of the transformer of the isolating DC-DC converter
1293 Secondary winding of the transformer of the isolating DC-DC converter
1294 First rectifier of the full-wave rectifier circuit within the transformer of the isolating DC-DC converter
1295 Second rectifier of the full-wave rectifier circuit within the transformer of the isolating DC-DC converter

What is claimed is:

1. A networked automation system comprising:
a first motor drive including:
an IN network port;
an OUT network port;
a switch mode power supply providing a low voltage source control power for the first motor drive; and
a regulation circuit for the switch mode power supply,
a second motor drive including:
an IN network port connected to the OUT network port of the first motor drive;
a switch mode power supply providing a low voltage source control power for the second motor drive; and
a regulation circuit for the switch mode power supply;
a high voltage source powering the first motor drive; and
wherein, the OUT network port of the first motor drive is coupled to the IN network port of the second motor drive for providing auxiliary power from the switch mode power supply of the first motor drive to the regulation circuit of the second motor drive at start up.

2. The networked automation system according to claim 1, further comprising a controller device and an auxiliary source of auxiliary power coupled to the controller device controller device comprising a plurality of controller network ports, each controller network port configured to couple to a network port of a plurality of motor drives for providing power from the auxiliary source at start up.

3. The networked automation system according to claim 1, further comprising:
a voltage limiting means for transmitting the auxiliary power and a voltage limiting means for receiving the auxiliary power such that the auxiliary power is received and limited in voltage in a fault condition arising from auxiliary power transmitting circuits or auxiliary power receiving circuits.

4. The networked automation system according to claim 3, wherein the voltage limiting means is selected from the group consisting of: a DC-DC converter, an isolating AC-DC converter, or an isolating DC-AC inverter.

5. A motor drive assembly comprising:
a high voltage source;
an auxiliary power source; and
a switch mode power supply coupled to the high voltage source, the switch mode power supply comprising,
a regulation circuit for the switch s DOW supply, and
at least one IN port configured to receive auxiliary power from the auxiliary power source,
wherein the auxiliary power powers the regulation circuit to allow the switch mode power supply to start up and operate.

6. The motor drive assembly according to claim 5, further comprising an isolating rectifier circuit, wherein the auxiliary power is received at the at least one IN port as alternating current and is coupled to the regulation circuit of the switch mode power supply as direct current.

7. The motor drive assembly according to claim 5, further comprising an isolating DC-DC converter circuit, wherein the auxiliary power is received at the at least one IN port as direct current and is coupled to the regulation circuit of the switch mode power as direct current by the isolating DC-DC converter circuit, wherein the isolating DC-DC converter circuit is configured to limit voltage to the regulation circuit under fault conditions.

8. The motor drive assembly according to claim 5, further comprising data lines in electrical communication with the at least one IN port and in electrical communication with center taps of at least one network transformer.

9. The motor drive assembly according to claim 6, wherein the isolating rectifier circuit is configured to limit voltage under fault conditions.

10. The motor drive assembly according to claim 6, further comprising an isolating inverter circuit, wherein auxiliary power is fed from the switch mode power supply as direct current and is converted to alternating current in the isolating inverter circuit, the isolating inverter circuit coupled to an OUT port of the switch mode power supply.

11. The motor drive assembly according to claim 6, further comprising data lines in electrical communication with the at least one OUT port and in electrical communication with the center taps of at least one network transformer.

12. The motor drive assembly according to claim 6, further comprising an isolating DC-DC converter circuit, wherein auxiliary power is fed from an output of the switch mode power supply as direct current and is converted to direct current in the isolating DC-DC converter circuit, the isolating DC-DC converter circuit coupled to the at least one OUT port.

13. The motor drive assembly according to claim 10, wherein the isolating inverter circuit is configured to limit voltage under fault conditions.

14. The motor drive assembly according to claim 12, wherein the DC-DC converter circuit includes a transmitter circuit that is selectively disabled to reduce power consumption from the auxiliary power source.

15. A networked automation system comprising:
- a first motor drive including: a regulation circuit; an IN network port; and a switch mode power supply providing a high voltage source control power for the first motor drive
- a high voltage source powering the first motor drive;
- a controller device having an OUT network port;
- an auxiliary source of auxiliary power coupled to the controller device;
- a network cable coupling the OUT network port to the IN network port for providing the auxiliary power from the auxiliary source to the regulation circuit at start up via the controller device; and
- a voltage limiting means for transmitting the auxiliary power via the network cable and a voltage limiting means for receiving the auxiliary power via the network cable such that the auxiliary power is received and limited in voltage in a fault condition arising from auxiliary power transmitting circuits or auxiliary power receiving circuits.

\* \* \* \* \*